(12) United States Patent
Gamberini

(10) Patent No.: US 7,140,403 B2
(45) Date of Patent: Nov. 28, 2006

(54) MACHINE FOR METERING A PRODUCT INTO CAPSULES

(75) Inventor: Erneto Gamberini, Rastignano (IT)

(73) Assignee: MG2 S.r.l. (IT)

( * ) Notice: Subject to any disclaimer, the term of this patent is extended or adjusted under 35 U.S.C. 154(b) by 56 days.

(21) Appl. No.: 11/095,475

(22) Filed: Apr. 1, 2005

(65) Prior Publication Data

US 2005/0230000 A1    Oct. 20, 2005

(30) Foreign Application Priority Data

Apr. 2, 2004    (IT) .......................... BO2004A0190

(51) Int. Cl.
*B65B 1/30*    (2006.01)
(52) U.S. Cl. .................. 141/83; 141/144; 141/168; 141/176; 53/473
(58) Field of Classification Search ................ 141/2, 141/18, 83, 130, 144, 153, 165, 168, 176; 53/272, 473

See application file for complete search history.

(56) References Cited

U.S. PATENT DOCUMENTS

| 4,343,130 A | * | 8/1982 | Facchini ....................... 53/272 |
| 4,574,646 A | | 3/1986 | Mattei et al. |
| 5,038,839 A | | 8/1991 | Morimoto et al. |
| 5,515,740 A | | 5/1996 | Gamberini |

* cited by examiner

*Primary Examiner*—Timothy L. Maust
(74) *Attorney, Agent, or Firm*—Finnegan, Henderson, Farabow, Garrett & Dunner, LLP

(57) ABSTRACT

A machine for metering a product into capsules has a number of conveying wheels for conveying the capsules; a metering station for metering the product; an empty-capsule weighing station; and a full-capsule weighing station. The empty-capsule weighing station has a fast-response scale; a first pickup arm for removing a capsule from an empty-capsule conveying wheel and feeding and reclaiming it to and from the fast-response scale; and a second release arm for removing a capsule from the pickup arm and releasing it to the conveying wheel.

9 Claims, 2 Drawing Sheets

MACHINE FOR METERING A PRODUCT INTO CAPSULES

The present invention relates to a machine for metering a product into capsules.

More specifically, the machine is designed for metering a drug, to which the following description refers purely by way of example.

BACKGROUND OF THE INVENTION

Drug metering machines comprise a weighing unit for determining the actual quantity of drug fed into the capsule. The weighing unit comprises first weighing means for weighing the empty capsule, second weighing means for weighing the full capsule, and a central control unit, to which the results of the two weighing operations are transmitted, and which calculates the difference between the two weighing operations to determine the drug quantity by weight actually fed into the capsule. The above weighing means normally have the drawback of being extremely bulky and slow in responding to the weighing operation, with all the obvious consequences in terms of space and output.

SUMMARY OF THE INVENTION

It is an object of the present invention to provide a machine for metering a product into capsules and designed to eliminate the drawbacks of known machines.

According to the present invention, there is provided a machine for metering a product into capsules, and comprising conveying means for conveying said capsules; a metering station for metering said product; an empty-capsule weighing station; and a full-capsule weighing station; said machine being characterized in that said empty-capsule weighing station comprises a compact, fast-response scale, a first pickup arm for removing a capsule from a conveying wheel conveying empty capsules, and a second release arm for removing a capsule from said pickup arm and releasing said capsule to said conveying wheel; one of said arms feeding and removing said capsule to and from said scale.

In a preferred embodiment of the machine according to the present invention, the scale is a load cell.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
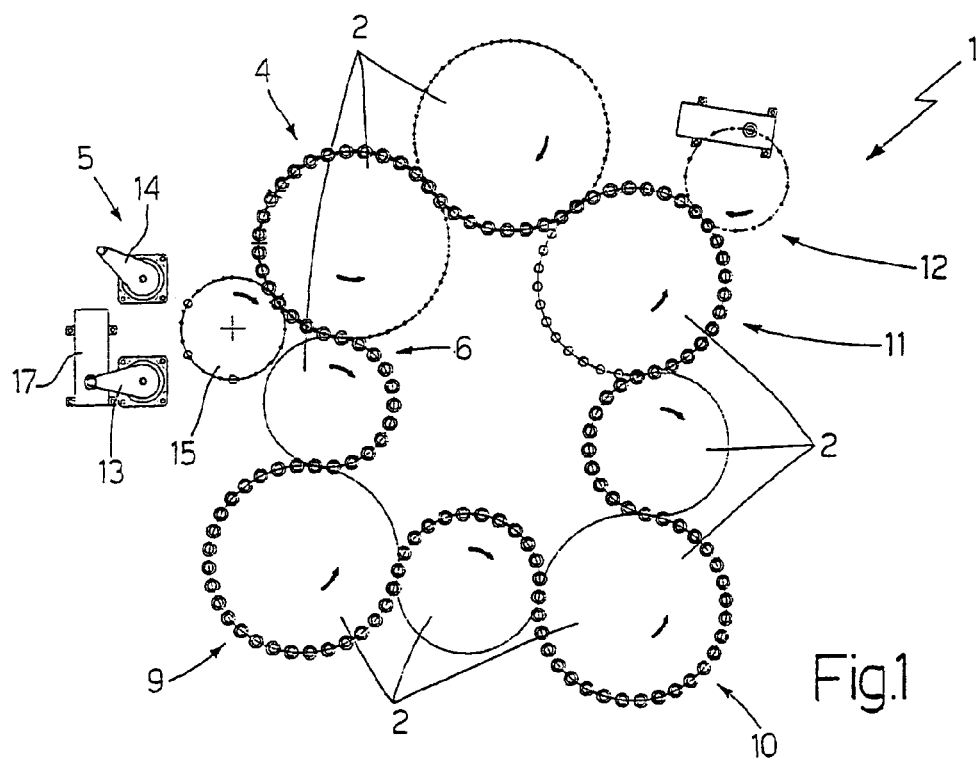
FIG. 1 shows a plan view of a preferred embodiment of the machine according to the present invention.

Number 1 in FIG. 1 indicates as a whole a machine for metering a drug into capsules in accordance with a preferred embodiment of the present invention.

Machine 1 comprises a number of conveying wheels 2 for conveying capsules 3 through a first station 4 for supplying capsules 3, a second station 5 for weighing empty capsules, a third station 6 for separating the bottom shells 7 from the top shells 8 (shown in FIG. 3), a fourth station 9 for metering a first quantity of the drug into bottom shells 7, a fifth station 10 for metering a second quantity of the drug into bottom shells 7, a sixth station 11 for closing bottom shells 7 with top shells 8, and a seventh and last station 12 or weighing the full capsules 3.

Figure 2:
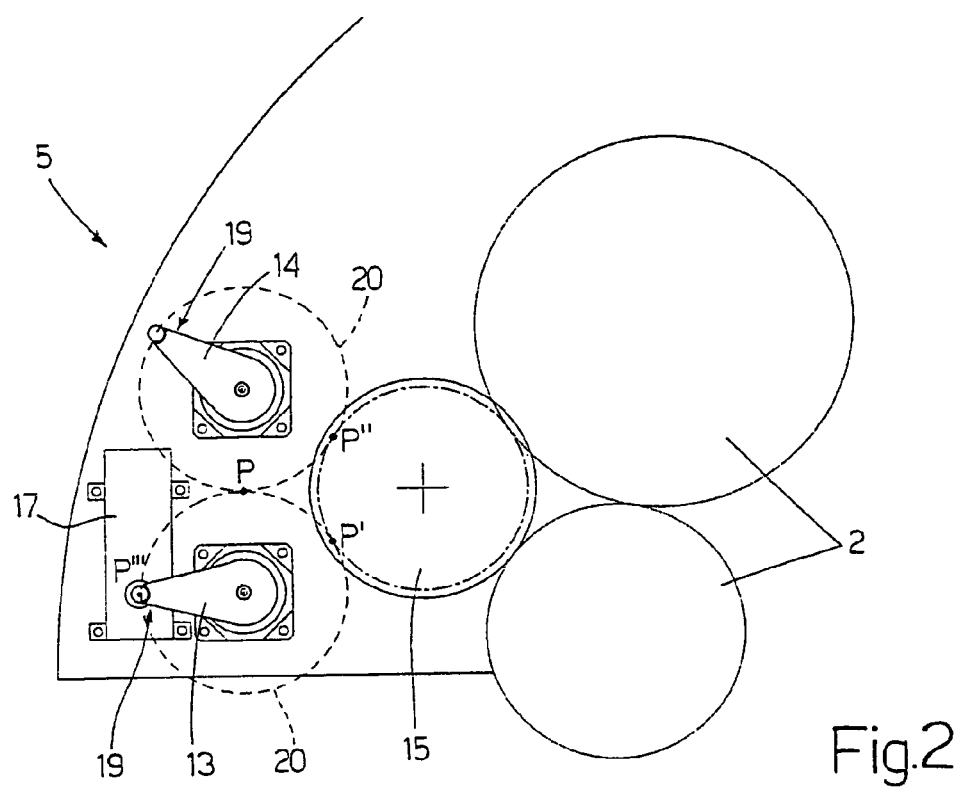
FIG. 2 shows a larger-scale detail of FIG. 1.
Figure 3:
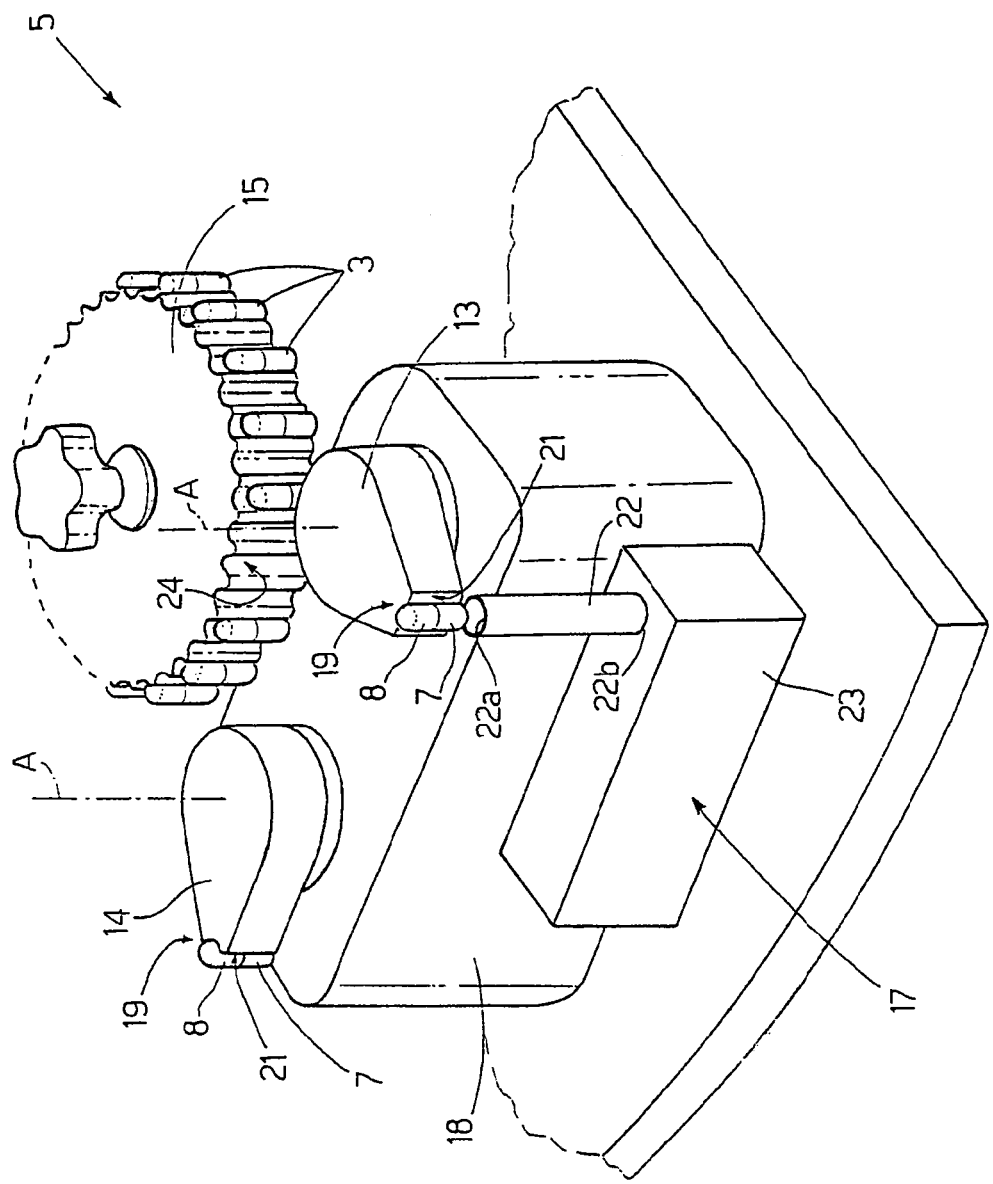
FIG. 3 shows a view in perspective of a detail of a preferred embodiment of the machine according to the present invention.

As shown in FIGS. 2 and 3, second station 5 for weighing the empty capsules comprises a first arm 13, a second arm 14, a conveying wheel 15 conveying empty capsules 3, and a load cell 17. Each arm 13, 14 is fitted to a base body 18 along a respective perpendicular axis A, so that one end 19 of the arm defines a circular path 20. Circular paths 20 are tangent to each other at a point P, and are tangent to conveying wheel 15 at respective points P' and P''. Circular path 20 of first arm 13 passes over an inlet 22a of load cell 17 at a point P'''. At end 19, each arm 13, 14 comprises a substantially semicylindrical gripping portion 21 with known suction means by which to both remove capsule 3 from conveying wheel 15 and retain it as it is fed along respective path 20.

More specifically, load cell 17 comprises a conveying tube 22 having a first end 22a located at point P''', and a second end 22b contacting a main body 23 of load cell 17.

Conveying tube 22 is associated with known suction and blowing means (not described for the sake of simplicity) by which conveying tube 22 receives capsule 3 and then feeds it back to arm 13. It is important to note how conveying tube 22 permits weighing and conveyance of capsule 3 with no change in the vertical orientation of the capsule.

In actual use, while second arm 14 retains a weighed capsule 3—referred to herein as capsule A for the sake of clarity—first arm 13 moves up to point P' and removes another capsule 3—referred to herein as capsule B for the sake of clarity—off conveying wheel 15, thus leaving an empty seat 24. Conveying wheel 15, rotating at constant speed, moves into a position in which the empty seat 24, formerly housing capsule B, is located at point P'', where second arm 14 releases capsule A into empty seat 24 on wheel 15.

On releasing capsule A, second arm 14 moves into a rest position along its own path 20. In the meantime, first arm 13 feeds capsule B to point P''', releases capsule B to load cell 17, and reclaims it once it is weighed by load cell 17. After reclaiming capsule B from load cell 17, arm 13 feeds it to point P and releases it to arm 14, which, on receiving capsule B, moves into a rest position along its own path P pending removal by first arm 13 of another capsule off conveying wheel 15. When first arm 13 frees another seat 24, second arm 14 moves capsule B up to point P'' and releases it into the empty seat 24.

As will be obvious to a technician skilled in the field, all the above operations are controlled by a central control unit connected to the various parts of the machine and in which the required operating conditions are set.

Passing a weighed capsule from first arm 13 to second arm 14 and correct timing of the two arms 13 and 14 provide for high-speed throughput of the capsules at the weighing station and a high output rate of the machine as a whole. In fact, by so doing, conveying wheel 15 rotates at constant speed with all of seats 24 occupied practically at all times, by virtue of the seat from which a capsule is removed being immediately filled by another, weighed, capsule.

The invention claimed is:

1. A machine (1) for metering a product into capsules (3), and comprising conveying means (2) for conveying said capsules (3); a metering station (9, 10) for metering said product; an empty-capsule weighing station (5); and a full-capsule weighing station (12); said machine being characterized in that said empty-capsule weighing station (5) comprises a compact, fast-response scale (17), a first pickup arm (13) for removing a capsule from a conveying wheel (15) conveying empty capsules, and a second release arm

(14) for removing a capsule (3) from said pickup arm (13) and releasing said capsule (3) to said conveying wheel (15); one of said arms (13, 14) feeding and removing said capsule (3) to and from said scale (17).

2. A machine as claimed in claim 1, characterized in that said scale is a load cell (17).

3. A machine as claimed in claim 1, characterized in that each of said arms (13, 14) is fitted along a perpendicular axis (A) so that one end (19) of the arm defines a circular path (20).

4. A machine as claimed in claim 3, characterized in that said circular paths (20) are tangent to each other at a given point (P), and in that each of the circular paths (20) is tangent at a respective given point (P', P'') to said conveying wheel (15).

5. A machine as claimed in claim 4, characterized in that said circular path (P) of said first pickup arm (13) extends, at a given point (P'''), over an inlet (22a) of said load cell (17).

6. A machine as claimed in claim 5, characterized in that said load cell (17) comprises a conveying tube (22) having one end (22a) defining said inlet of said load cell (17).

7. A machine as claimed in claim 6, characterized by comprising suction and blowing means connected to said conveying tube (22) to receive and return the capsule (3) from and to the first pickup arm (13); said conveying tube (22) and said suction and blowing means maintaining the same vertical orientation of said capsule.

8. A machine as claimed in claim 3, characterized in that said end (19) of each of the arms (13, 14) comprises a substantially semicylindrical gripping portion (21) for gripping the capsules (3).

9. A machine as claimed in claim 8, characterized by comprising suction means associated with said gripping portion (21).

\* \* \* \* \*

UNITED STATES PATENT AND TRADEMARK OFFICE
CERTIFICATE OF CORRECTION

| | |
|---|---|
| PATENT NO. | : 7,140,403 B2 |
| APPLICATION NO. | : 11/095475 |
| DATED | : November 28, 2006 |
| INVENTOR(S) | : Ernesto Gamberini |

Page 1 of 1

It is certified that error appears in the above-identified patent and that said Letters Patent is hereby corrected as shown below:

On the title page, item (75), "Erneto" should be --Ernesto--.

Signed and Sealed this

Twelfth Day of June, 2007

JON W. DUDAS
*Director of the United States Patent and Trademark Office*